(12) United States Patent
Aitharaju et al.

(10) Patent No.: US 11,208,155 B2
(45) Date of Patent: Dec. 28, 2021

(54) IMPACT PROTECTION STRUCTURES WITH LAYERED HONEYCOMB AND CORRUGATED DESIGNS AND METHODS FOR MAKING THE SAME

(71) Applicant: GM GLOBAL TECHNOLOGY OPERATIONS LLC, Detroit, MI (US)

(72) Inventors: Venkateshwar R. Aitharaju, Troy, MI (US); Xiaosong Huang, Novi, MI (US); Gurpinder Dhaliwal, Sterling Heights, MI (US); David E Roth, Ferndale, MI (US); Tejas R. Bhavsar, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 132 days.

(21) Appl. No.: 16/741,252

(22) Filed: Jan. 13, 2020

(65) Prior Publication Data
US 2021/0214021 A1    Jul. 15, 2021

(51) Int. Cl.
| | | |
|---|---|---|
| *B62D 29/04* | (2006.01) | |
| *B60R 19/02* | (2006.01) | |
| *B60R 19/03* | (2006.01) | |
| *B62D 21/15* | (2006.01) | |
| *B60R 19/18* | (2006.01) | |

(52) U.S. Cl.
CPC ......... *B62D 29/043* (2013.01); *B60R 19/023* (2013.01); *B60R 19/03* (2013.01); *B62D 21/152* (2013.01); *B60R 2019/186* (2013.01)

(58) Field of Classification Search
CPC .. B62D 29/043; B62D 21/152; B60R 19/023; B60R 19/03; B60R 2019/186
See application file for complete search history.

(56) References Cited

U.S. PATENT DOCUMENTS

| | | |
|---|---|---|
| 5,581,468 A | 12/1996 | White et al. |
| 7,819,462 B1 | 10/2010 | Owens |
| 8,033,592 B2 | 10/2011 | Hsu et al. |
| 8,109,492 B2 | 2/2012 | Winocur |
| 8,309,644 B1 | 11/2012 | Huang |

(Continued)

*Primary Examiner* — D Glenn Dayoan
*Assistant Examiner* — Melissa Ann Bonifazi
(74) *Attorney, Agent, or Firm* — Quinn IP Law (57) ABSTRACT

Presented are multilayer, fiber-reinforced impact protection structures with honeycomb-core or corrugated-layer designs, methods for making/using such structures, and vehicles with traction battery packs supported on skid plates fabricated from such structures. A multilayer impact protection structure includes a first layer with continuous fibers embedded in a polymeric matrix, and a second layer that is attached to the first layer and includes an elastomeric polymer. A third layer, which is attached to one side of the first layer opposite of the second layer, includes a fiber-reinforced polymer honeycomb and/or corrugated structure. An optional fracture detection circuit is attached to the first or third layer, and is configured to detect a break in the impact protection structure. The corrugated structure may include multiple reinforcement ribs that are interposed within and substantially orthogonal to a series of mutually parallel, elongated ridges. Comparatively, the honeycomb structure includes a lattice of adjoining polygonal cells.

20 Claims, 3 Drawing Sheets

(56) References Cited

U.S. PATENT DOCUMENTS

| | | | |
|---|---|---|---|
| 8,481,170 B2 | 7/2013 | Vanimisetti et al. | |
| 8,961,724 B2 | 2/2015 | Polewarczyk et al. | |
| 9,227,673 B2 | 1/2016 | Berger et al. | |
| 9,399,490 B2 | 7/2016 | Aitharaju et al. | |
| 9,650,003 B2 * | 5/2017 | Owens | B62D 25/2054 |
| 11,005,134 B2 * | 5/2021 | Hilmann | B60L 3/0046 |
| 2006/0106147 A1 | 5/2006 | Fasulo et al. | |
| 2006/0199890 A1 | 9/2006 | Fasulo et al. | |
| 2007/0063393 A1 | 3/2007 | Vernin et al. | |
| 2007/0299185 A1 | 12/2007 | Ottaviani et al. | |
| 2010/0098925 A1 | 4/2010 | Fasulo et al. | |
| 2011/0121225 A1 | 5/2011 | Posudievsky et al. | |
| 2012/0213997 A1 | 8/2012 | Wang et al. | |
| 2018/0029316 A1 | 2/2018 | Coppola et al. | |
| 2018/0030922 A1 | 2/2018 | Kia et al. | |
| 2018/0030923 A1 | 2/2018 | Coppola et al. | |
| 2018/0030924 A1 | 2/2018 | Coppola et al. | |
| 2018/0031027 A1 | 2/2018 | Coppola et al. | |
| 2018/0169975 A1 | 6/2018 | Aitharaju et al. | |

\* cited by examiner

IMPACT PROTECTION STRUCTURES WITH LAYERED HONEYCOMB AND CORRUGATED DESIGNS AND METHODS FOR MAKING THE SAME

INTRODUCTION

The present disclosure relates generally to composite polymer panels. More specifically, aspects of this disclosure relate to fiber-reinforced impact protection structures for underbody skid plates of vehicular traction battery packs.

Current production motor vehicles, such as the modern-day automobile, are originally equipped with a powertrain that operates to propel the vehicle and power the vehicle's onboard electronics. In automotive applications, for example, the vehicle powertrain is generally typified by a prime mover that delivers driving power through an automatic or manually shifted power transmission to the vehicle's final drive system (e.g., differential, axle shafts, road wheels, etc.). Automobiles have historically been powered by a reciprocating-piston type internal combustion engine (ICE) assembly due to its ready availability and relatively inexpensive cost, light weight, and overall efficiency. Such engines include compression-ignited (CI) diesel engines, spark-ignited (SI) gasoline engines, two, four, and six-stroke architectures, and rotary engines, as some non-limiting examples. Hybrid electric and full electric ("electric-drive") vehicles, on the other hand, utilize alternative power sources to propel the vehicle and, thus, minimize or eliminate reliance on a fossil-fuel based engine for tractive power.

A full electric vehicle (FEV)—colloquially branded as an "electric car"—is a type of electric-drive vehicle configuration that altogether removes the internal combustion engine and attendant peripheral components from the powertrain system, relying solely on electric traction motors for propulsion and for supporting accessory loads. The engine assembly, fuel supply system, and exhaust system of an ICE-based vehicle are replaced with a single or multiple traction motors, a traction battery back, and battery cooling and charging hardware in an FEV. Hybrid electric vehicle (HEV) powertrains, in contrast, employ multiple sources of tractive power to propel the vehicle, most commonly operating an internal combustion engine assembly in conjunction with a battery-powered or fuel-cell-powered electric traction motor. Since hybrid-type, electric-drive vehicles are able to derive their power from sources other than the engine, hybrid electric vehicle engines may be turned off, in whole or in part, while the vehicle is propelled by the electric motor(s).

High-voltage electrical systems govern the transfer of electricity between the traction motor(s) and a rechargeable traction battery pack (also referred to as "electric-vehicle battery" or "EVB") that stores and supplies the requisite power for operating many electric-drive powertrains. A traction battery pack, which is significantly larger, more powerful, and higher in capacity than a 12-volt starting, lighting, and ignition (SLI) battery, contains multiple stacks of battery cells that are grouped into individual battery modules and packaged inside a battery pack housing. Some vehicular battery systems employ multiple independently operable, high-voltage battery packs to provide higher voltage delivery and greater system capacity through increased amp-hours. The vehicle's electric system may employ a front-end DC-to-DC power converter that is electrically connected to the vehicle's traction battery pack(s) in order to increase the supply of voltage to a high-voltage main direct current (DC) bus and an electronic power inverter module (PIM). Operation and control of a multi-phase electric motor, such as permanent magnet synchronous traction motors, may be accomplished by employing the PIM to transform DC electric power to alternating current (AC) power using pulse-width modulated control signals output from a resident Battery Pack Control Module (BPCM).

Automobile chassis frames are designed to support the vehicle's powertrain components, steering and braking systems, passengers, etc., during static loading, and to contribute toward vehicle stiffness and impact attenuation during dynamic loading. Some chassis frames have a ladder-like construction with a pair of opposing side rails or rocker panels connected via a series of transversely oriented cross members. Projecting forward from front ends of the rocker panels/side rails may be respective front rails connected via a front cross member to cooperatively define a front cradle. In the same vein, projecting rearward from rear ends of the rocker panels/side rails may be respective rear rails connected via a rear cross member to cooperatively define a rear subframe. For some HEV configurations, the engine, transmission, and front suspension is generally supported by the front cradle, whereas the electric motor, fuel tank, and rear suspension are generally supported by the rear subframe. Electric vehicles generally support the weight of the battery pack on a subjacent support tray, which is anchored to the chassis frame and packaged within a rear trunk compartment or underneath a rear passenger bench seat.

SUMMARY

Presented herein are multilayered, fiber-reinforced impact protection structures with honeycomb and corrugated designs, methods for making and methods for using such impact protections structures, and vehicles with traction battery packs supported on skid plates fabricated from such impact protection structures. By way of example, there are presented impact protection structures with over-molded corrugation designs and honeycomb-core sandwich designs. The impact protection structure may include an over-molded corrugated layer with continuous carbon/glass fiber reinforcement on the inboard-facing "non-impact" side, and discontinuous carbon/glass fiber reinforcement on the outboard-facing "impact" side. Optionally or alternatively, the impact protection structure may include a carbon fiber (CF) honeycomb core, e.g., with variable-thickness honeycomb walls and an aerial weight of about 2.5 kg/m$^2$ to about 3.5 kg/m'. In this instance, continuous glass/carbon-fiber face sheets may be applied to both the inboard and outboard surfaces of the honeycomb core. The non-impact-side face sheet may be 50%-500% times thicker than the face sheet on the impact side of the honeycomb core. A compressible material, such as a synthetic rubber elastomer, is mounted on the inboard side of the corrugated layer/honeycomb core, e.g., located between the impact protection structure and a traction battery housing/tray. An optional sensing device composed of electrical copper wiring embedded within or laminated to an interior surface of an impact-side face sheet monitors the integrity of the structure, e.g., detecting breaks and cracks.

Attendant benefits for at least some of the disclosed concepts may include novel hybrid-composite, fiber-reinforced polymer (FRP) sandwich structures that are designed to withstand road debris and to protect battery packs of electric-drive vehicles. Hybrid-fiber reinforcement constructions presented herein may help to balance performance and cost, and mitigate/eliminate corrosion of neighboring metal components. Other attendant benefits may include skid plate designs that help to assuage vehicle noise, vibration, and harshness (NVH) while reducing gross vehicle weight and concomitantly improving vehicle range and fuel economy. At least some of the disclosed mounting architectures also help to improve packaging efficiency and underbody aerodynamic performance.

Aspects of this disclosure are directed to multilayered, fiber-reinforced impact protection structures with honeycomb-core and corrugated-layer designs. In an example, a multilayer impact protection structure is constructed from a first (non-impact side) layer that includes continuous fibers embedded in a polymer matrix, and a second (compressible) layer that is attached to a first (inboard) side of the first layer and includes an elastomeric polymer. A third (impact side) layer, which is attached to a second (outboard) side of the first layer opposite that of the second layer, includes a fiber-reinforced polymer honeycomb structure and/or an FRP corrugated structure. An optional fracture detection circuit, which is attached to one of the foregoing layers, is operable to detect breaks/cracks in the impact protection structure. For constructions in which the third layer includes an FRP corrugated structure, the corrugated structure includes a series elongated and mutually parallel, solid ridges. Multiple reinforcement ribs may be interposed within and oriented substantially orthogonal to these solid ridges. For constructions in which the third layer includes an FRP honeycomb structure, the honeycomb structure includes a lattice of adjoining polygonal cells. An optional fourth (outer face sheet) layer, which may be attached to the third layer on a side opposite that of the first (inner face sheet) layer, includes continuous carbon and/or glass fibers embedded in a polymer matrix.

Additional aspects of this disclosure are directed to vehicles equipped with skid plates fabricated from disclosed multilayer impact protection structures. As used herein, the terms "vehicle" and "motor vehicle" may be used interchangeably and synonymously to include any relevant vehicle platform, such as passenger vehicles (ICE, HEV, FEV, fuel cell, fully and partially autonomous, etc.), commercial vehicles, industrial vehicles, tracked vehicles, off-road and all-terrain vehicles (ATV), motorcycles, farm equipment, watercraft, aircraft, etc. In an example, a motor vehicle includes a vehicle chassis with multiple road wheels and other standard original equipment. Mounted on the vehicle chassis is one or more electric traction motors that operate alone (e.g., for FEV powertrains) or in conjunction with an internal combustion engine assembly (e.g., for HEV powertrains) to selectively drive one or more of the road wheels to thereby propel the vehicle. Also mounted on the vehicle body is one or more rechargeable traction battery packs that selectively store and transmit electric current to power the traction motor(s). The battery pack(s) and motor (s) may be interconnected via a high-voltage electric circuit.

Continuing with the discussion of the above example, the vehicle also includes a skid plate that is attached along the undercarriage of the vehicle chassis and supports thereon the traction battery pack. The skid plate is fabricated with a first layer that includes continuous fibers embedded in a polymeric matrix, and a second layer that includes an elastomeric polymer. The second layer is attached to an inboard side of the first layer, disposed between the other skid plate layers and the battery pack. A third layer is attached to an outboard side of the first layer, opposite the inboard side. This third layer includes a fiber-reinforced polymer honeycomb structure and/or an FRP corrugated structure.

Also presented herein are methods for manufacturing and methods for using any of the disclosed impact protection structures, battery pack and skid plate assemblies, and/or motor vehicles. In an example, a method is presented for constructing a multilayer impact protection structure. This representative method includes, in any order and in any combination with any of the above and below disclosed options and features: forming a first layer, which includes embedding continuous fibers in a polymeric matrix (e.g., via resin transfer molding); attaching a second layer to a first side of the first layer (e.g., via lamination, adhesion, sonic or heat welding, etc.), the second layer including an elastomeric polymer; and attaching a third layer to a second side of the first layer, opposite the first side, the third layer including a fiber-reinforced polymer honeycomb and/or corrugated structure. This may include forming the third layer via compression molding the honeycomb structure and/or over-molding the corrugated structure. The method may further include attaching a fourth layer to the third layer on a side opposite that of the first layer. The fourth layer includes continuous carbon and/or glass fibers embedded in a polymer matrix. As a further option, the method may further include attaching a fracture detection circuit to any one or more of the first through fourth layers, the fracture detection circuit being configured to detect a break in the impact protection structure The above summary does not represent every embodiment or every aspect of this disclosure. Rather, the foregoing summary merely provides examples of some of the novel concepts and features set forth herein. The above features and advantages, and other features and attendant advantages of this disclosure, will be readily apparent from the following detailed description of illustrative examples and modes for carrying out the present disclosure when taken in connection with the accompanying drawings and the appended claims. Moreover, this disclosure expressly includes any and all combinations and subcombinations of the elements and features presented above and below.

The present disclosure is amenable to various modifications and alternative forms, and some representative embodiments are shown by way of example in the drawings and will be described in detail below. It should be understood, however, that the novel aspects of this disclosure are not limited to the particular forms illustrated in the above-enumerated drawings. Rather, the disclosure is to cover all modifications, equivalents, combinations, subcombinations, permutations, groupings, and alternatives falling within the scope of this disclosure as encompassed, for example, by the appended claims.

DETAILED DESCRIPTION

This disclosure is susceptible of embodiment in many different forms. Representative embodiments of the present disclosure are shown in the drawings and will herein be described in detail with the understanding that these embodiments are provided as an exemplification of the disclosed principles, not limitations of the broad aspects of the disclosure. To that extent, elements and limitations that are described, for example, in the Abstract, Introduction, Summary, and Detailed Description sections, but not explicitly set forth in the claims, should not be incorporated into the claims, singly or collectively, by implication, inference or otherwise.

For purposes of the present detailed description, unless specifically disclaimed: the singular includes the plural and vice versa; the words "and" and "or" shall be both conjunctive and disjunctive; the words "any" and "all" shall both mean "any and all"; and the words "including," "containing," "comprising," "having," and the like, shall each mean "including without limitation." Moreover, words of approximation, such as "about," "almost," "substantially," "generally," "approximately," and the like, may each be used herein in the sense of "at, near, or nearly at," or "within 0-5% of," or "within acceptable manufacturing tolerances," or any logical combination thereof, for example. Lastly, directional adjectives and adverbs, such as fore, aft, inboard, outboard, starboard, port, vertical, horizontal, upward, downward, front, back, left, right, etc., may be with respect to a motor vehicle, such as a forward driving direction of a motor vehicle, when the vehicle is operatively oriented on a horizontal driving surface.

Figure 1:
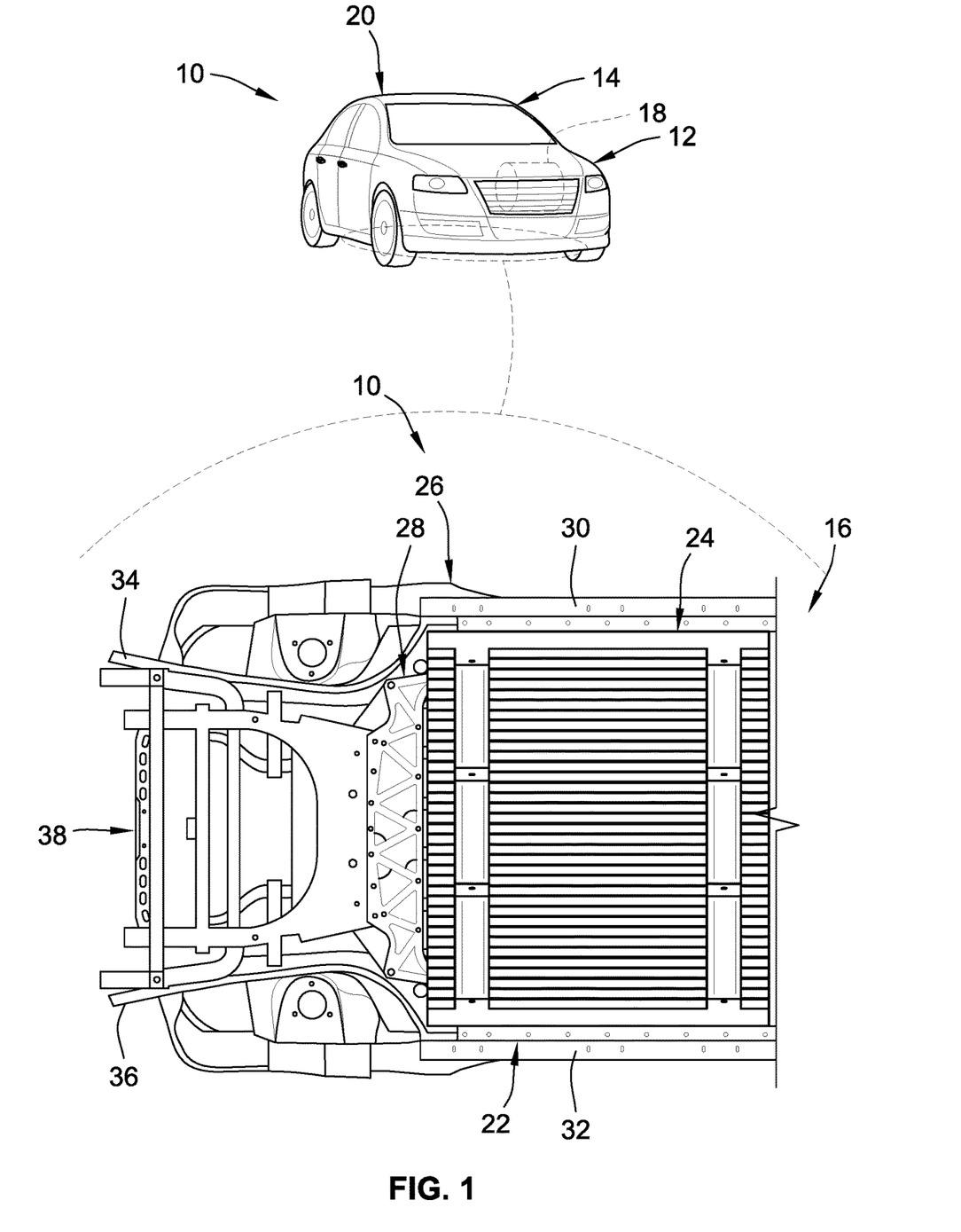
FIG. 1 is an elevated, perspective-view illustration of a representative motor vehicle with an inset view of the underside of the vehicle chassis showing an underbody skid plate in accordance with aspects of the present disclosure.

Referring now to the drawings, wherein like reference numbers refer to like features throughout the several views, there is shown in FIG. 1 a perspective-view illustration of a representative automobile, which is designated generally at 10 and portrayed herein for purposes of discussion as a sedan-style, electric-drive passenger vehicle. Mounted within the automobile 10 body, e.g., aft of a motor compartment 12 and underneath a passenger compartment 14, is a traction battery pack 16 that is electrically coupled to one or more electric motor-generators 18 that operate to propel the vehicle 10. The illustrated automobile 10—also referred to herein as "motor vehicle" or "vehicle" for short—is merely an exemplary application with which the aspects and features of this disclosure may be practiced. In the same vein, implementation of the present concepts into an all-electric vehicle configuration should also be appreciated as an exemplary application of the novel concepts disclosed herein. Accordingly, aspects and features of the present disclosure may be incorporated into other powertrain configurations, may be implemented for any logically relevant type of motor vehicle, and may be utilized for automotive and non-automotive applications alike. Lastly, the drawings presented herein are not necessarily to scale and are provided purely for instructional purposes. Thus, the specific and relative dimensions shown in the drawings are not to be construed as limiting.

Vehicle 10 of FIG. 1 may take on any electric-drive vehicle configuration necessitating improved underbody protection, such as a hybrid electric vehicle (HEV), plug-in electric vehicle (PEV), extended-range electric vehicle (E-REV), or battery electric vehicle (BEV), as some non-limiting examples. In this regard, the vehicle 10 is constructed with a rechargeable energy storage system (RESS), such as a high-voltage, high ampere-hour traction battery pack 16 with an array of lead-acid, lithium-ion, lithium-silicon, nickel metal hydride, or other suitable type of electric vehicle battery (EVB). The representative battery pack 16 is equipped with a rigid, protective battery pack housing 22 that encases therein eight (8) electric battery modules (not visible) arranged in a pattern of four transverse rows of two battery modules per row. Battery pack 16 may be composed of greater or fewer battery modules that may be arranged in similar or alternative patterns from that described above. Each battery modules may include a series of cylindrical, prismatic or pouch battery cells, such as a stack of self-contained, hermetically sealed lithium-ion (Li-ion), lithium-polymer (LiPo), and/or nickel-metal hydride (NiMH) battery cells, for example. For simplification of design and maintenance, and for reduction in cost, the modules may be approximately the same or, in general, identical to one another. A deformable nonconductive spacer, cooling fluid plumbing, and peripheral control hardware (not shown) may be disposed within the battery pack housing 22 if desired.

Vehicle 10 is originally equipped with a rigid floor pan (not visible) that extends across the top of the battery pack modules, e.g., to separate the traction battery pack 16 from the interior of the passenger compartment 14. The floor pan and battery pack 16, namely battery housing 22, are anchored to a chassis frame 26 that supports thereon or, alternatively, may be combined with select portions of a vehicle body 20 (e.g., in a unibody frame construction). Chassis frame 26 is formed with a pair of longitudinally oriented, laterally spaced and generally parallel box-girder chassis side rails 30 and 32 (e.g., rocker panels). A series of transversely oriented U-shaped cross members (hidden from view behind skid plate 24 and shear plate 28 in FIG. 1) are longitudinally spaced apart from one another and function to interconnect the chassis side rails 30, 32. Projecting from a front end of each chassis side rail 30, 32 is a respective forward side rail 34 and 36. For some applications, the intermediate cross members are provided with seat mounts (not shown) that functionally support thereon driver-side and passenger-side seat frames. A front suspension cradle 38 is mechanically attached to the traction battery pack 16 by a structural shear plate 28, which forms part of the vehicle's undercarriage.

Acting as an aerodynamic underbody panel and as a shield for protecting the underside of the traction battery pack 16, for example, the skid plate 24 includes, or may consist essentially of, a multilayered, fiber-reinforced impact protection structure, non-limiting examples of which are shown at 124 (FIGS. 2 and 3), 224 (FIG. 4) and 324 (FIG. 5) in the drawings. Although differing in appearance, it should be appreciated that the representative impact protection structure 124 of FIG. 2 may include any of the features and options described below with respect to the impact protection structures 224 and 324 of FIGS. 4 and 5, respectively, and vice versa. As used herein, the term "layer" is inclusive of, but does not necessarily require a particular segment of a composite construction span the entirety of (i.e., be coextensive with) all remaining layers. Additionally, enumerating the constituent layers of the impact protection structures 124, 224 and 324—be it in the Summary, Description or Claims—is provided as a manner of simplified reference and, thus, is not to be construed as a designated order or a desired amount. In addition, the terms "discontinuous fiber" or "chopped fiber" or "short fiber" may be used interchangeably and synonymously to reference fibers with an approximate fiber length of about 1 millimeter (mm) to about 30 mm and, if desired, that are arranged in a primarily random orientation to provide isotropic behaviors. The terms "continuous fiber" and "long fiber," by contrast, may be used interchangeably and synonymously to reference fibers with a relatively high length-to-diameter aspect ratio (e.g., long fiber AR of about 80-100 vs. short fiber AR of about 3-5) that, if desired, are arranged in a predetermined orientation to provide anisotropic behaviors. The fibers may take on any suitable material, such as glass, carbon, aramid, boron, metal, and/or basalt, and each fiber may have a square or circular transverse cross-section with a width/diameter of about 5-50 micrometers (μm).

Figures 2, 3:
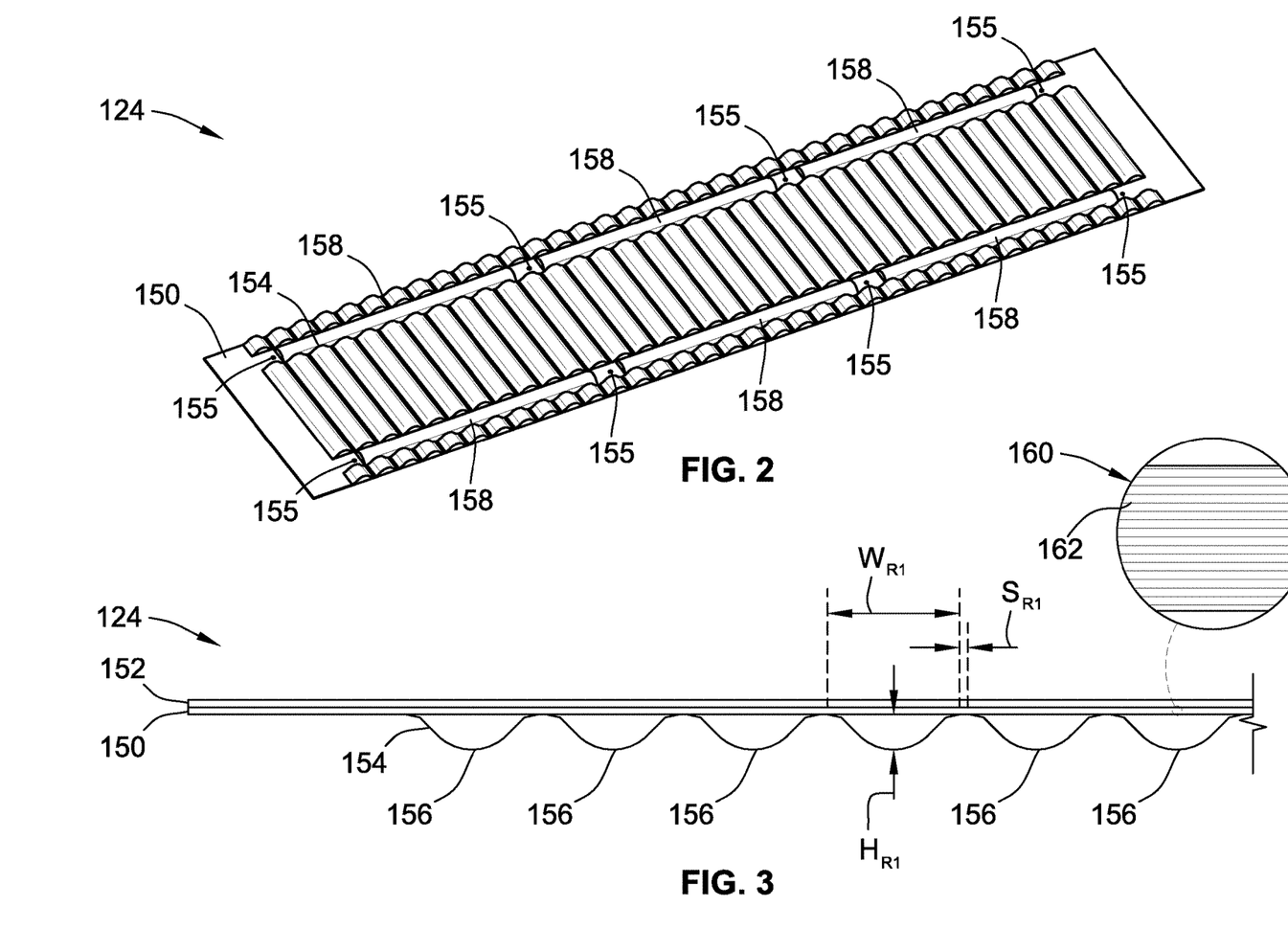
FIG. 2 is an elevated, perspective-view illustration of a representative multilayered, fiber-reinforced impact protection structure with corrugated impact layer design in accordance with aspects of the present disclosure.
FIG. 3 is a side-view illustration of a portion of the representative impact protection structure of FIG. 2.

Turning first to FIGS. 2 and 3, there is presented an example of an impact protection structure 124 with an over-molded, corrugated impact layer design. In an example, a compression molding manufacturing system employs a high-flow compression molding press for fabricating any of a variety of thermoplastic or thermoset fiber-reinforced polymer (FRP) sandwich structures that are generally composed of at least three layers: a first (non-impact side, middle) layer 150; a second (pack-facing side, compressible) layer 152 attached to a first (inboard) side of the first layer 150; and a third (road-facing, impact side) layer 154 that is attached to a second (outboard) side of the first layer 150, opposite that of the second layer 152. In accord with the illustrated example, the first and second layers 150 and 152 span substantially the entirety of and, thus, are coextensive in length and width with each other. These two layers may also share a common height, e.g., of about 3 to 8 mm. Conversely, the illustrated third layer 154 is not coextensive with the first and second layers 150 and 152: although spanning the fore-aft width of layers 150 and 152, the third layer 154 spans only a portion of their side-to-side lengths. Moreover, the third layer 154 may be three (3) to eight (8) times thicker than either of the first and second layers 150 and 152. Furthermore, the second and third layers 152, 154 are shown mounted directly to respective opposing surfaces of the first layer 150.

While portrayed as a tripartite construction, it is contemplated that the impact protection structure 124 comprise more than the three layers presented in FIG. 3. For instance, any of the illustrated impact protection structures may comprise one or more adhesive layers, additional reinforcement layers, and/or optional laminate layers or surface coatings (e.g., corrosion-resistant sprays, aluminum plating, paints, reinforced cellulosic materials, or any combination thereof). In contrast, it is contemplated that the impact protection structures 124, 224, 324 consist essentially or solely of the illustrated layers and, thus, are limited to three or four total layers. In this regard, the respective and collective dimensions of the illustrated layers may be modified, singly and in combination, to accommodate other foreseeable applications. Recognizably, select layers may be formed, contemporaneously or simultaneously, as a single-piece, unitary structure.

Over-molded impact structure designs with corrugation geometries incorporate a hybrid composite configuration with distinct fiber types integrated into select regions of the composite structure. In accord with the representative example of FIGS. 2 and 3, the central first layer 150 is fabricated, in whole or in part, from continuous carbon fiber (CF) or glass fiber (GF) embedded in a thermoset-polymer matrix. The non-impact side FRP first layer 150 may be assembled to a protected component, such as traction battery pack 16 of FIG. 1, by adhesive bonding, dedicated mounting bracket, and/or mechanical fasteners. For instance, the first layer 150 may be fabricated with multiple through-holes 155 for receiving bolts or other suitable fasteners. By comparison, the pack-facing, compressible second layer 152 is fabricated, in whole or in part, from an elastic polymer, such as a synthetic and/or natural rubber elastomer. For traction battery pack applications, the second layer 152 is disposed between the battery pack housing 22 and the non-impact side first layer 150. The ground-facing, impact-side third layer 154, on the other hand, is an FRP structure fabricated, in whole or in part, from discontinuous CF/GF embedded in a thermoset-polymer matrix. For ease of manufacture, and a reduction in part count and cost, the third layer 154 maybe over-molded directly onto the first layer 150.

To protect the vehicle undercarriage and rechargeable energy storage system from road debris, inclement weather, and other damage-inducing driving elements, the ground-facing third layer 154 is formed with engineered corrugations. A representative corrugated geometry may be typified, at least in part, by a series of elongated, mutually parallel ridges 156. Each ridge 156 has a solid, semicylindrical shape with one or both lateral sides thereof adjoining neighboring ridges 156. For a battery pack application, the longitudinal lengths of the elongated ridges 156 extend in a fore-aft direction relative to the vehicle 10. With this arrangement, the series of ridges 156 has a sinusoidal-waveform profile, as best seen in FIG. 3. In this example, each ridge 156 has a common ridge height $H_{R1}$ of about 5 mm to about 40 mm or, in some embodiments, about 10 mm to about 20 mm. Additionally, each ridge 156 has a common ridge width $W_{R1}$ of about 15 mm to about 60 mm or, in some embodiments, about 25 mm to about 50 mm. The ridges 156 may be separated from one another by a ridge spacing $S_{R1}$.

To increase the lateral strength of the impact protection structure 124 of FIG. 2 relative to the vehicle, the third layer 154 may also be fabricated with multiple transversely oriented, mutually parallel reinforcement ribs 158 that are substantially orthogonal to the ridges 156. It is envisioned that these ribs 158 may be positioned around the perimeter of and thereby frame the series of ridges 156; however, in the illustrated configuration, the ribs 158 are inserted within the ridges 156, with a forward row of three laterally spaced ribs 158 inset back from a front edge of the ridges 156, and a rearward row of three laterally spaced ribs 158 inset forward from a back edge of the ridges 156. Each rib 158 may have a solid, semicylindrical shape with one or both longitudinal ends thereof facing neighboring ribs 158. The corrugated structure of FIGS. 2 and 3 may include chopped fibers (or, alternatively, continuous fibers) with a volume fraction of fiber of approximately 25-60%. As shown, the third layer 152 is a unitary, single-piece structure with solid ridges and ribs; alternative configurations may replace some or all of the solid ridges and/or ribs with hollow, fluted channels.

To monitor the integrity of the impact protection structure 124 and detect any cracks, fractures, holes, or cavitation (collectively "break") in the protective layers thereof, a fracture detection circuit (designated generally at 160 in the inset view of FIG. 3) is attached to any one or more of the impact protection structure's layers 150, 152, 154. In accord with the illustrated example, the fracture detection circuit 160 is embedded within the non-impact side first layer 150 or, alternatively, laminated to an outboard surface of the first layer 150. Fracture detection circuit 160 is designed to detect a break in the impact-side third layer 154. As shown, the fracture detection circuit 160 includes an engineered pattern of copper electrical wires 162 that carry an electrical current during operation of the vehicle. If a projectile breaks through or otherwise damages the third layer 154 and concomitantly breaks or otherwise impairs one of the wires 162, the electrical circuit is broken and the current disrupted; an in-vehicle computing device (not shown) senses this disruption and generates an electronic signal to warn an operator of the vehicle.

Figures 4, 5:
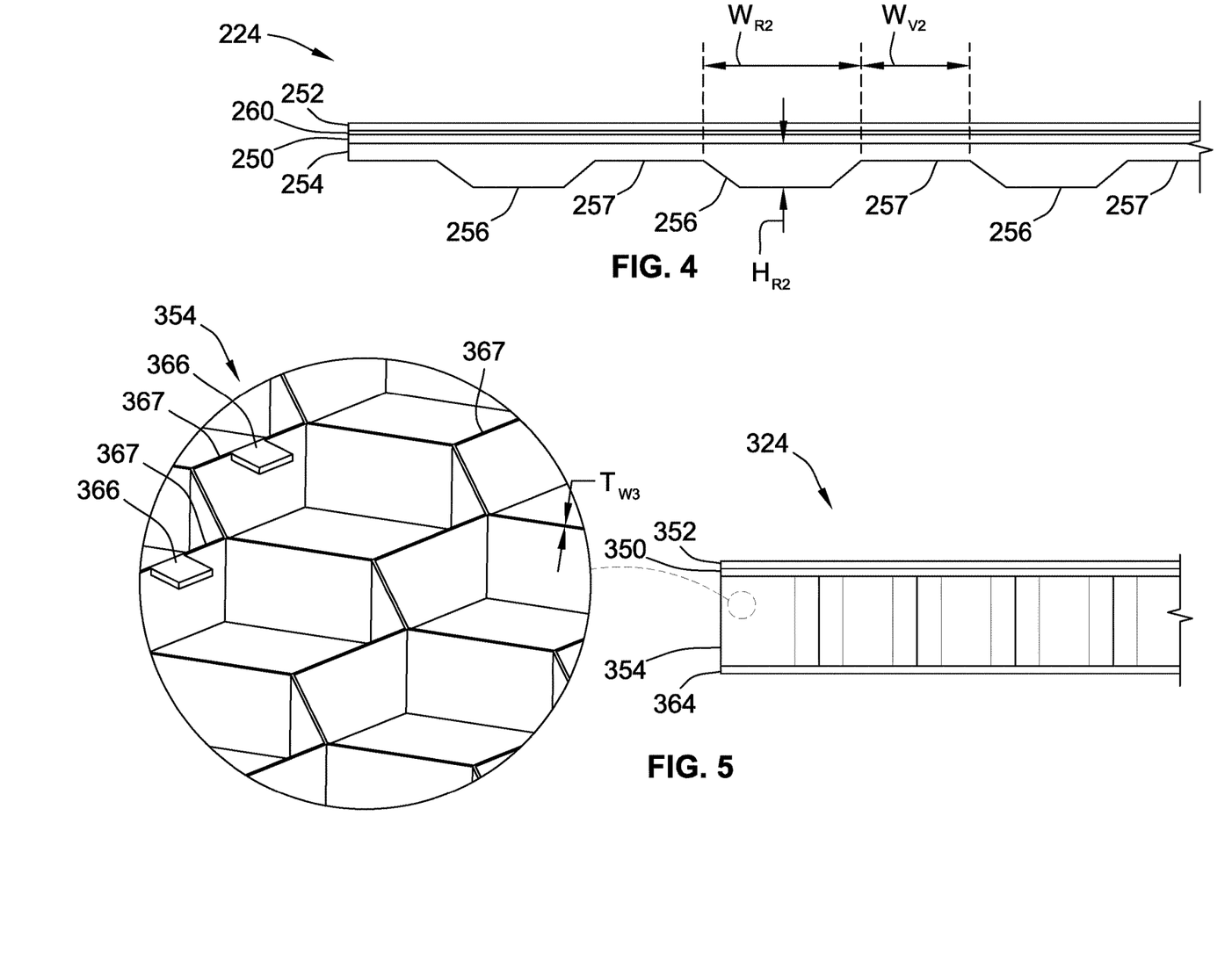
FIG. 4 is a side-view illustration of a portion of another representative multilayered, fiber-reinforced impact protection structure with corrugated impact layer design in accordance with aspects of the present disclosure.
FIG. 5 is a side-view illustration of a portion of yet another representative multilayered, fiber-reinforced impact protection structure with honeycomb core design in accordance with aspects of the present disclosure.

FIG. 4 presents another example of an impact protection structure 224 with an over-molded, corrugated impact layer design. In this example, the FRP sandwich structure is formed via a combination of compression molding and over-molding of continuous and discontinuous CF or GF into a quadripartite assembly with at least four layers: a first (non-impact side, middle) layer 250; a second (pack-facing side, compressible) layer 252 attached to a first (inboard) side of the first layer 250; a third (road-facing, impact side) layer 254 that is attached to a second (outboard) side of the first layer 250, opposite that of the second layer 252; and an optional fourth (sensor) layer 260 sandwiched between the first and second layers 250, 252. In accord with the illustrated example, the four layers 250, 252, 254, 260 are coextensive with one another and, thus, share a common length and width. On the other hand, each layer 250, 252, 254, 260 may have a distinct height. Moreover, the second and third layers 252, 254 are shown mounted directly to the first and fourth layers 250, 260, respectively.

Similar to the impact protection structure 124 of FIG. 2, the first layer 250 of impact protection structure 224 of FIG. 4 is fabricated, in whole or in part, from continuous carbon or glass fibers embedded in a thermoset-polymer matrix, and the compressible second layer 252, like layer 152 of FIG. 2, is fabricated, in whole or in part, from an elastic polymer. Likewise, the impact-side third layer 254 is fabricated, in whole or in part, from discontinuous carbon or glass fibers embedded in a thermoset-polymer matrix, and the fourth layer 260 is similar in structural content and operation to the fracture detection circuit 160 but is laminated to, rather than embedded in, the first layer 250. In a specific example, the third layer 254 is fabricated from a ready-to-mold glass-fiber reinforced polyester material, such as a suitable sheet molding compound (SMC).

The ground-facing third layer 154 is formed with engineered corrugations to protect the vehicle undercarriage and rechargeable energy storage system. Similar to the representative geometry of FIG. 3, the corrugated third layer 254 is typified by a series of elongated, mutually parallel ridges 256 that are separated by interleaved valleys 257. Each ridge 256 has a solid, polyhedral shape (e.g., truncated square pyramid) with one or both lateral sides thereof adjoining neighboring ridges 256. Like the ridge 156 of FIGS. 2 and 3, the longitudinal lengths of the elongated ridges 256 of FIG. 4 may extend in a fore-aft direction relative to the vehicle 10. With this arrangement, the series of ridges 256 has a polygonal-waveform profile. In this example, each ridge 256 has a common ridge height $H_{R2}$ of about 5 mm to about 40 mm or, in some embodiments, about 15 mm to about 30 mm. Additionally, each ridge 156 has a common ridge width $W_{R2}$ of about 15 mm to about 60 mm or, in some embodiments, about 15 mm to about 25 mm. The ridges 256 may be separated from one another by a valley width $W_{V2}$ of the individual valleys 257.

Turning next to FIG. 5, there is presented an example of a sandwich impact protection structure 324 with an energy-absorbing honeycomb core design. This configuration is composed of at least four layers: a first (non-impact side, inner face sheet) layer 350; a second (pack-facing side, compressible) layer 352 attached to a first (inboard) side of the first layer 350; a third (road-facing, impact side) layer 354 that is attached to a second (outboard) side of the first layer 350, opposite that of the second layer 352; and a fourth (impact side, outer face sheet) layer 364 attached to a ground-facing (outboard) surface of the third layer 354. In accord with the illustrated example, the first, second, third and fourth layers 350, 352, 354 and 364 may span substantially the entirety of and, thus, may be coextensive in length and width with one another. Moreover, the third layer 354 may be five (5) to ten (10) times thicker than the other layers 350 and 352. In the same vein, the inner face sheet first layer 350 may be approximately 50-500% thicker than the outer face sheet fourth layer 364 (e.g., 1-3 mm vs. 3-5 mm). Furthermore, the second and third layers 352, 354 are shown mounted directly to respective opposing surfaces of the first layer 350, while each of the face sheets 350, 364 is shown mounted directly to a respective surface of the honeycomb core layer 354.

In accord with the representative example of FIG. 5, the two face sheets, namely first and fourth layers 350, 364, are fabricated, in whole or in part, from CF/GF/Kevlar fibers embedded in a thermoset of thermoplastic polymer matrix. Like the first layers 150 and 250 of FIGS. 2 and 4, respectively, the first layer 350 of FIG. 5 may be operatively attached to a protected component, such as traction battery pack 16 of FIG. 1, by adhesive bonding, dedicated mounting bracket, and/or mechanical fasteners. All of the illustrated second layers 152, 252, 352 may be fabricated, in whole or in part, from an elastomeric polymer. The honeycomb core layer 354 is fabricated from CF or GF-reinforced polyester material or other suitable SMC. As seen in the inset view of FIG. 5, the third layer 354 may be fabricated with a distributed array of horizontally oriented, coplanar flanges 366, each of which projects from a discrete section of the honeycomb core; these flanges 366 adhere or weld to the first and/or fourth layers 350, 364.

Continuing with the discussion of the FRP honeycomb composition of the impact structure's third layer 354, the honeycomb is generally typified by a lattice of adjoining polygonal (e.g., square, rectangular, hexagonal, etc.) cells 367. As shown, the FRP honeycomb structure of the third layer 354 has an aerial weight of about 2.0 kg/m² to about 4.0 kg/m². In addition, a wall thickness $T_{W3}$ of the honeycomb walls may change in a vertical direction, i.e., the honeycomb wall thickness tapers from top (~3 mm) to bottom (~1 mm), for optimum impact mitigation. It may be desired that disclosed methods of constructing a multilayer impact protection structure include: forming a first layer including embedding continuous fibers in a polymeric matrix; attaching a second layer to a first side of the first layer, the second layer including an elastomeric polymer; and attaching a third layer to a second side of the first layer, opposite the first side, the third layer including a fiber-reinforced polymer (FRP) honeycomb and/or corrugated structure. Methods of constructing a multilayer impact protection structure may include: forming a first layer including embedding continuous fibers in a polymeric matrix and a third layer (including a fiber-reinforced polymer (FRP) corrugated structure) next to the first layer simultaneously; and attaching a second layer to a first side of the first layer (opposite the third side), the second layer including an elastomeric polymer. It should be recognized that the order of execution of the herein described operations may be changed, additional operations may be added, and some of the operations described may be modified, combined into a single operation, or eliminated.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:

1. A multilayer impact protection structure, comprising:
    a first layer including continuous fibers embedded in a polymeric matrix;
    a second layer attached to a first side of the first layer and including an elastomeric polymer;
    a third layer attached to a second side of the first layer, opposite the first side, and including a fiber-reinforced polymer (FRP) honeycomb and/or corrugated structure; and
    a fracture detection circuit attached to the first layer or the third layer and configured to detect a break in the impact protection structure.

2. The impact protection structure of claim 1, wherein the fracture detection circuit includes an engineered pattern of electrical wires laminated to or embedded within the first layer.

3. The impact protection structure of claim 1, wherein the third layer includes the FRP corrugated structure, the FRP corrugated structure including a series of elongated, mutually parallel ridges.

4. The impact protection structure of claim 3, wherein the series of elongated, mutually parallel ridges has a sinusoidal-waveform profile or a polygonal-waveform profile.

5. The impact protection structure of claim 3, wherein each ridge in the series of mutually parallel ridges has a height of approximately 10-30 mm and a width of approximately 15-50 mm.

6. The impact protection structure of claim 3, wherein the FRP corrugated structure further includes a plurality of reinforcement ribs interposed within and substantially orthogonal to the ridges.

7. The impact protection structure of claim 3, wherein the FRP corrugated structure includes chopped fibers with a volume fraction of fiber of approximately 20-60%.

8. A multilayer impact protection structure comprising:
    a first layer including continuous fibers embedded in a polymeric matrix;
    a second layer attached to a first side of the first layer and including an elastomeric polymer; and
    a third layer attached to a second side of the first layer, opposite the first side, and including a fiber-reinforced polymer (FRP) honeycomb structure, the FRP honeycomb structure including a lattice of adjoining polygonal cells.

9. The impact protection structure of claim 8, further comprising a fracture detection circuit attached to the first layer or the third layer and configured to detect a break in the impact protection structure.

10. The impact protection structure of claim 8, wherein the FRP honeycomb structure has an aerial weight of about 2.0 kg/m$^2$ to about 4.0 kg/m$^2$ and honeycomb walls with a variable wall thickness.

11. The impact protection structure of claim 8, wherein the FRP honeycomb structure further includes a plurality of flanges projecting from discrete sections of the lattice of adjoining polygonal cells and adhered or welded to the first layer.

12. The impact protection structure of claim 8, further comprising a fourth layer attached to the third layer on a side opposite that of the first layer and including continuous carbon and/or glass fibers embedded in a polymer matrix.

13. The impact protection structure of claim 12, wherein the first layer has a first thickness about 50-500% thicker than a fourth thickness of the fourth layer.

14. The impact protection structure of claim 1, wherein the first and third layers are simultaneously formed as a unitary, single-piece structure.

15. A multilayer impact protection structure, comprising:
    a first layer including continuous fibers embedded in a polymeric matrix;
    a second layer attached to a first side of the first layer and including an elastomeric polymer; and
    a third layer attached to a second side of the first layer, opposite the first side, and including a fiber-reinforced polymer (FRP) honeycomb and/or corrugated structure,
    wherein the first and third layers are formed as a unitary, single-piece structure.

16. The impact protection structure of claim 15, further comprising a fracture detection circuit attached to the first layer or the third layer and configured to detect a break in the impact protection structure.

17. The impact protection structure of claim 15, wherein the third layer includes the FRP corrugated structure, the FRP corrugated structure including a series of elongated, mutually parallel ridges.

18. The impact protection structure of claim 17, wherein the series of elongated, mutually parallel ridges has a sinusoidal-waveform profile or a polygonal-waveform profile.

19. The impact protection structure of claim 15, wherein the third layer includes the FRP honeycomb structure, the FRP honeycomb structure including a lattice of adjoining polygonal cells.

20. The impact protection structure of claim 19, further comprising a fourth layer attached to the third layer on a side opposite that of the first layer, the fourth layer including continuous carbon and/or glass fibers embedded in a polymer matrix.

* * * * *